United States Patent [19]

Kitamura et al.

[11] Patent Number: 4,857,669
[45] Date of Patent: Aug. 15, 1989

[54] BRACKET FOR MOUNTING WIRING DEVICES

[75] Inventors: Masuo Kitamura; Mitsuhiro Takagi, both of Tsu; Masaaki Nakamura, Mie, all of Japan

[73] Assignee: Matsushita Electric Works, Ltd., Osaka, Japan

[21] Appl. No.: 188,330

[22] Filed: May 4, 1988

[30] Foreign Application Priority Data

Oct. 23, 1987 [JP] Japan .................. 62-267415

[51] Int. Cl.⁴ .............................................. H01H 9/20
[52] U.S. Cl. ...................... 174/53; 200/296; 248/27.1
[58] Field of Search ............... 174/53; 439/535, 538, 439/539, 540; 200/296, 297; 248/27.1

[56] References Cited

U.S. PATENT DOCUMENTS

| | | | |
|---|---|---|---|
| 2,248,201 | 7/1941 | Russell et al. | 174/53 |
| 3,562,468 | 2/1971 | Stefani | 174/53 X |
| 3,964,705 | 6/1976 | Giovanni | 174/53 X |

FOREIGN PATENT DOCUMENTS 58-249  1/1983  Japan .

Primary Examiner—Arthur T. Grimley
Assistant Examiner—David A. Tone
Attorney, Agent, or Firm—Armstrong, Nikaido, Marmelstein, Kubovcik & Murray

[57] ABSTRACT

A wall bracket for mounting wiring devices comprises a flat frame having first and second jambs which define therebetween an opening for receiving the body portions of the wiring devices. The wiring device has a strap having mounting ears projecting on either side of the device and is attached to the frame with the mounting ears engaged into first and second slots formed in the frame. The first slots are formed in the first jamb and open to the opening for receiving the mounting ears on one side of the device. The second slots for receiving the mounting ears on the other side of the device are formed in a resilient strip extending along the second jamb in spaced relation outwardly thereof. The resilient strip is integrally connected at its longitudinal ends to the ends of the second jamb respectively through U-shaped hinge sections which are bent within the plane of the frame so that the resilient strip is capable of flexing outwardly within that plane to permit the snap engagement of the mounting ears into the second slots. With the hinge connections within the plane of the frame, it is possible to minimize the amount of rearward projection of the resilient strip yet assuring the snap engagement due to the flexing of the resilient strip.

9 Claims, 13 Drawing Sheets

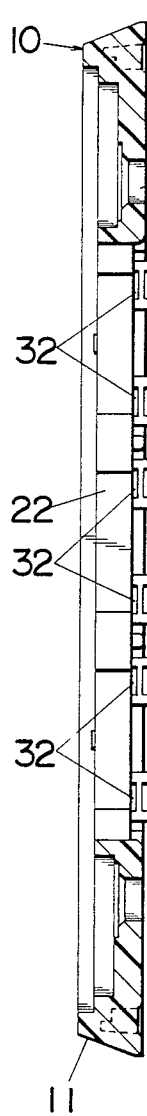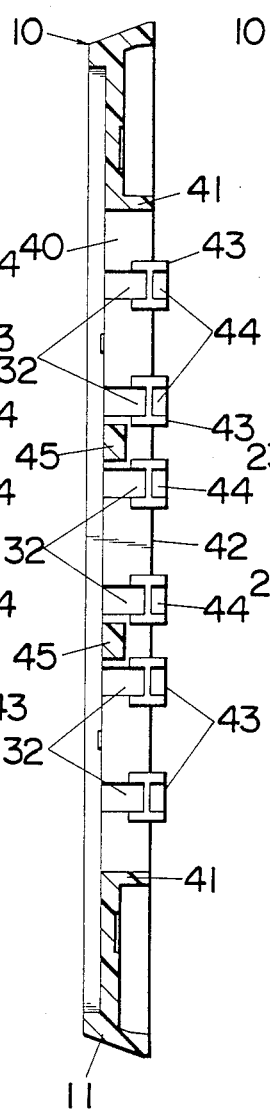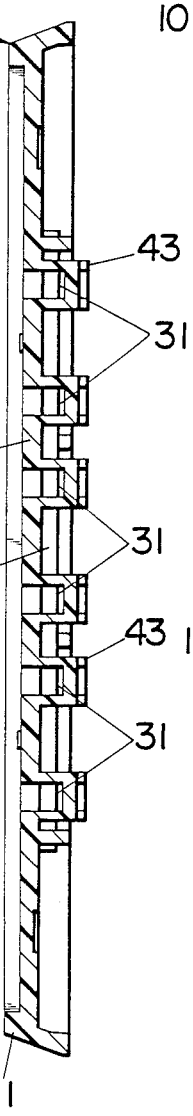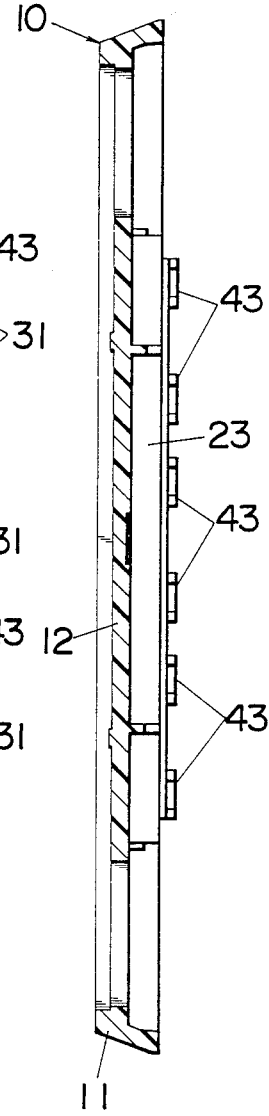

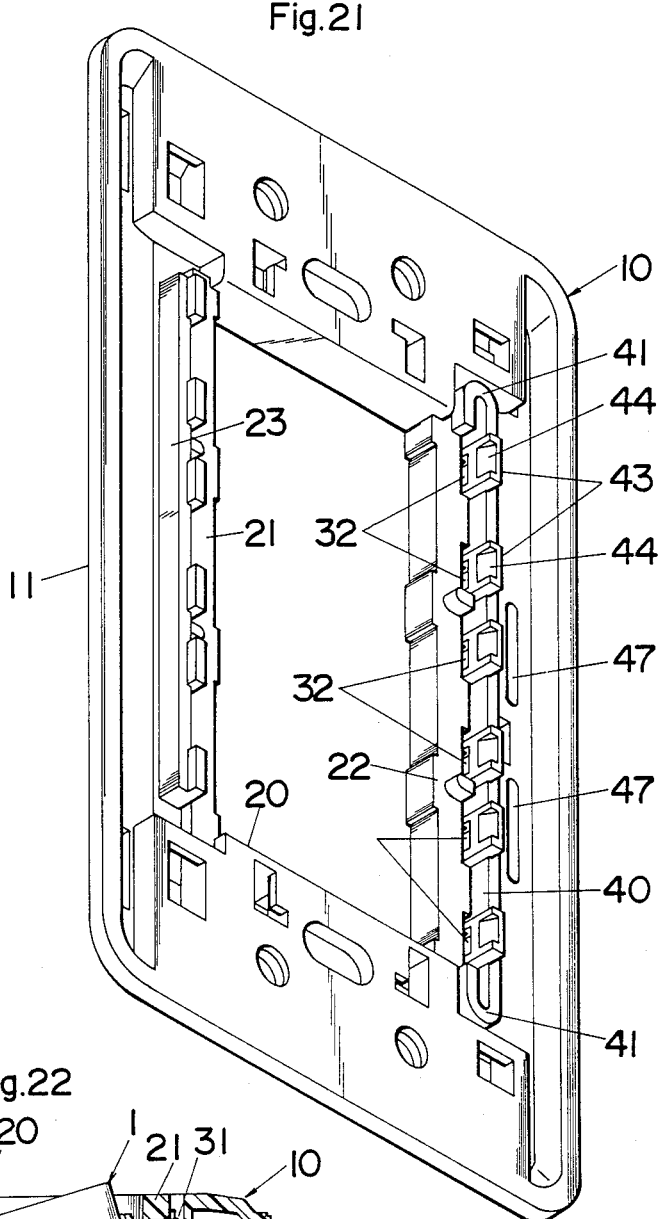
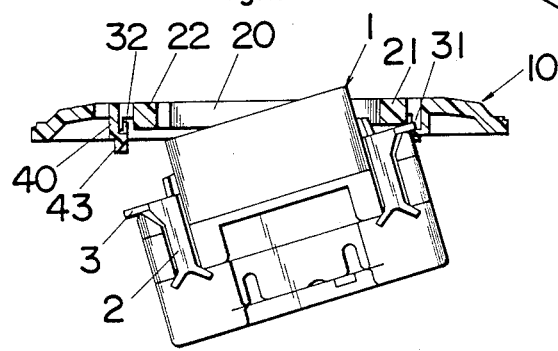

BRACKET FOR MOUNTING WIRING DEVICES

BACKGROUND OF THE INVENTION

1. Field of the Invention

The present invention is directed to a bracket for mounting wiring devices such as electrical receptacles, switches, and the like modules to be installed in the wall surface of a building.

2. Description of the prior art

Brackets for supporting wiring devices are extensively utilized in the art for installation of the wiring devices, such as electrical receptacles and switches in the wall surface of a building or home. For easy mounting of the wiring devices without the need of any tool, a bracket assembly has been proposed by the applicant of this application as seen in Japanese Patent Publication No. 58-249 issued on Jan. 6, 1983. This prior bracket is formed to have an opening for mounting wiring devices. Each of the wiring devices is of a modular type having a strap with mounting ears which project on either side of the body portion for snapping connection into corresponding slots formed in each of side bars or jambs of the opening. For effecting this snapping connection, one of the jambs is provided with a resilient strip and cooperative therewith to form therebetween the slots into which the mounting ears are snapped through the flexing or elastic deformation of the resilient strip. In detail, the resilient strip is made to flex outwardly so as to allow the insertion of the mounting ear into the corresponding slots past the resilient strip, after which it returns inwardly to lock the mounting ears into the slots. Thus, the snapping connection can be made by simply flexing the resilient strip without resorting to a tool such as a screwdriver, enhancing the convenience of mounting the wiring devices to the bracket. Although with this convenience, the prior bracket suffers from an increased depth of the resilient strip which results from the structural limitation that the resilient strip is connected at its longitudinal ends to the adjacent jambs respectively through U-shaped hinge sections extending rearwardly of the bracket in a plane perpendicular to the general plane of the bracket. To provide a sufficient amount of resilient deformation to the resilient strip, the U-shaped hinge sections are elongated in the depth direction to thereby add an increased depth to the overall structure of the bracket. Such increased depth requires correspondingly an increased depth for the hole provided in a wall board or the like wall finish and therefore might pose a problem in a particular site where the wall finish is too thin to accommodate the bracket or even the rearwardly projecting resilient strip.

SUMMARY OF THE INVENTION

The present invention avoids the above problem in a manner to minimize the amount of rearward projection of the resilient strip, yet assuring enough amount of resilient deformation thereto to retain the convenience of the snap connection of the wiring devices. A bracket in accordance with the present invention comprises a flat frame having first and second parallel jambs which defines therebetween a rectangular opening capable of receiving upto three modules of wiring devices in side-by-side relation. The wiring device is mounted to the bracket with its body portion fitted through the opening and has a strap provided on either of the body portion with at least one mounting ear by which the wiring device is attachable to the frame. The first jam is formed with a series of longitudinally spaced first slots open to the opening for receiving the mounting ear on one side of the wiring device. Extending along and in outwardly spaced relation to the second jamb is a resilient strip which is formed with a series of second slots open to the opening for receiving the mounting ear on the other side of the wiring device. The resilient strip is integrally connected at its longitudinal ends respectively to the longitudinal ends of the second jamb through U-shaped hinge sections so as to acquire adequate resiliency that the resilient strip can flex outwardly to allow the engagement and disengagement of the mounting ear into and out of the corresponding slot. The U-shaped hinge sections are bent within the plane of the frame so that the resilient strip can flex in the plane parallel to the plane of the frame for effecting the snap connection of the wiring device while minimizing the amount of rearward projection of the resilient strip.

Accordingly, it is a primary object of the present invention to provide an improved bracket for mounting wiring devices of which depth is kept at a minimum for providing easy installation as well as aesthetic appeal.

The resilient strip integrally includes a rearwardly projecting skirt which is formed on its inner surface opposite to the center opening with a corresponding number of taper guides to the second slots. Each of the taper guide has a guide surface inclined rearwardly and outwardly from the rear edge of each second slot and terminating at the rearward edge of the skirt so that the mounting ear can slide over the taper guide by flexing the skirt together with the resilient strip outwardly to permit the mounting ear to come into locked engagement with the second slot past the guide surface. With this provision of the taper guides, the snapping engagement of the mounting ears into the second slots can be easily performed to thereby further enhance the convenience of attaching the wiring device to the bracket, which is therefore another object of the present invention.

The frame is provided in the form of a wall plate having a peripheral flange for direct mounting on a wall. The first and second jambs are spaced inwardly from the peripheral flange to leave therebetween marginal areas adapted to receive thereon a cover plate having a window exposing therethrough the front end of the wiring device. The resilient strip, which extends along the second jamb and is connected at its longitudinal ends through the U-shaped hinge sections, is formed intermediate its longitudinal ends with two spaced cross ribs which divide the length of the resilient strip into three sections each corresponding to one wiring device and formed with the second slots. Each of the cross ribs is integrally connected at its opposite ends respectively to the second jamb and an additional resilient segment formed in the marginal area adjacent the peripheral flange. The additional resilient segment extends a short distance relative to the length of the resilient strip in a parallel relation thereto and is integrally supported at its longitudinal ends in the marginal area so that it is capable of resiliently flexing laterally within the plane of the frame. The resilient strip is cooperative with the additional resilient segments such that each of the three sections of the resilient strip can flex substantially independently and in substantially equal amount for permitting the attaching and detaching of the wiring device to and from of each of the three sections in which each of the two end sections undergoes the flexing as involving the flexing of the adjacent one of the additional resilient segments while the middle section undergoes the flexing as involving the simultaneous flexing of both of said additional resilient segments.

It is therefore a further object of the present invention to provide an improved bracket which can be directly mounted on the wall without requiring an intermediate attachment and which has a unique structural arrangement that the resilient strip can perform substantially the same amount of flexing at each of the three sections arranged along the length of the strip to selectively receive the wiring device.

In a preferred embodiment, the rigid strip and the skirt are preferably formed in the frametto be within the thickness of the peripheral flange so that the frame can be installed on a wall surface with only the wiring device projecting rearwardly into a box in the wall. With this result, the installation of the wiring device to the wall surface requires no additional work to widen a hole in the wall surface for accommodating the rearward projections on the bracket. In other words, the hole in the wall surface is required to have a dimension only to receive the rear end of the wiring device and requires no extra dimension for the skirt, while enabling the bracket to be in flush abutment against the wall surface around the hole. This greatly simplifies the installation procedure in many work cites, which is therefore a further object of the present invention.

These and still other objects and advantages will become apparent from the following description of the preferred embodiment when taken in conjunction with te attached drawings.

BRIEF DESCRIPTION OF THE DRAWINGS

FIG. 11 is a cross section taken along line 11—11 of FIG. 2;

FIG. 12 is a cross section taken along line 12—12 of FIG. 2;

FIG. 13 is a cross section taken along line 13—13 of FIG. 2;

FIG. 14 is a cross section taken along line 14—14 of FIG. 2;

FIG. 21 is a perspective view of the bracket of FIG. 19 as viewed from the fear;

FIG. 22 is an explanatory view illustrating the snapping connection of the wiring device to the bracket.

DESCRIPTION OF THE PREFERRED EMBODIMENTS

Figure 1:
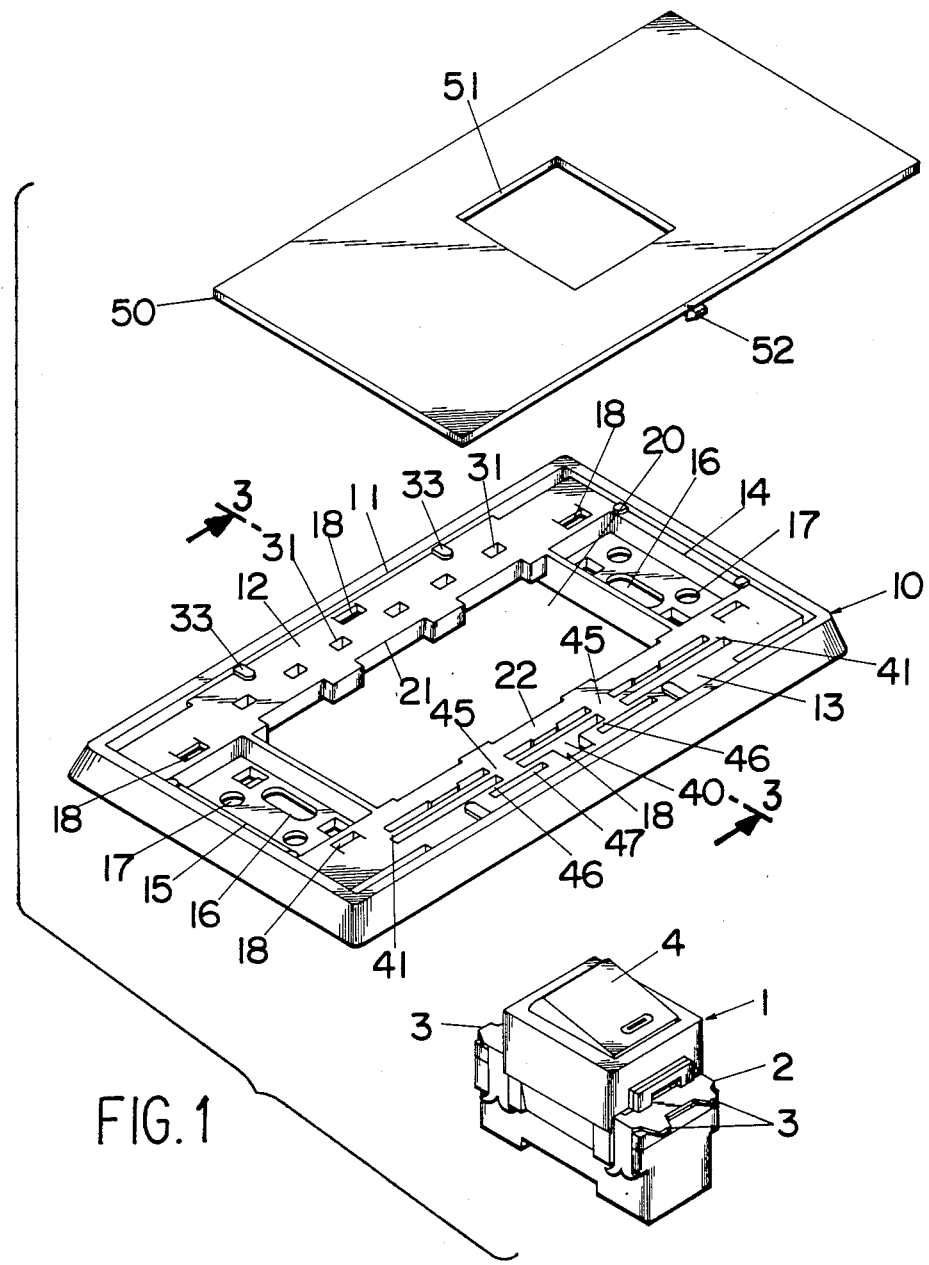
FIG. 1 is an exploded perspective view of a bracket shown with a cover and a wiring device in accordance with a first embodiment of the present invention.

Referring to FIG. 1, there is shown a wall bracket for mounting wiring devices 1 which is adapted to be installed on a wall surface with the wiring devices 1 connected to lines routed into a box (not shown) embedded in the wall. The bracket is molded from a plastic material as a one-piece member in the form of a rectangular thin plate comprising a flat frame 10 with a peripheral flange 11. Formed centrally of the frame 10 is a rectangular center opening 20 through which the body portion of the wiring device 1 is fitted. The center opening 20 is defined between a pair of first and second parallel jambs 21 and 22 and accommodates up to three modules of the wiring devices 1 such as switches and electrical receptacles. Each of the wiring devices 1 has a metallic strap 2 with a pair of mounting ears 3 projecting on either side of the device 1. In the illustrated example, a switch module is shown as the wiring device 1 and is supported to the frame 10 with the mounting ears 3 engaged in first and second slots 31 and 32 formed respectively in the frame 10 along the first and second jambs 21 and 22. A cover plate 50 with a window 51 is placed over the frame 10 within the peripheral flange 11 to only expose the front end portion of the wiring device 1, or a rocker handle 4 of the switch in the illustrated example. Although only the cover plate 50 is shown to have the window 51 of the size accommodating a single wiring device 2, other cover plates having the window of the size corresponding to two and three wiring devices are selectively utilized.

Figure 2:
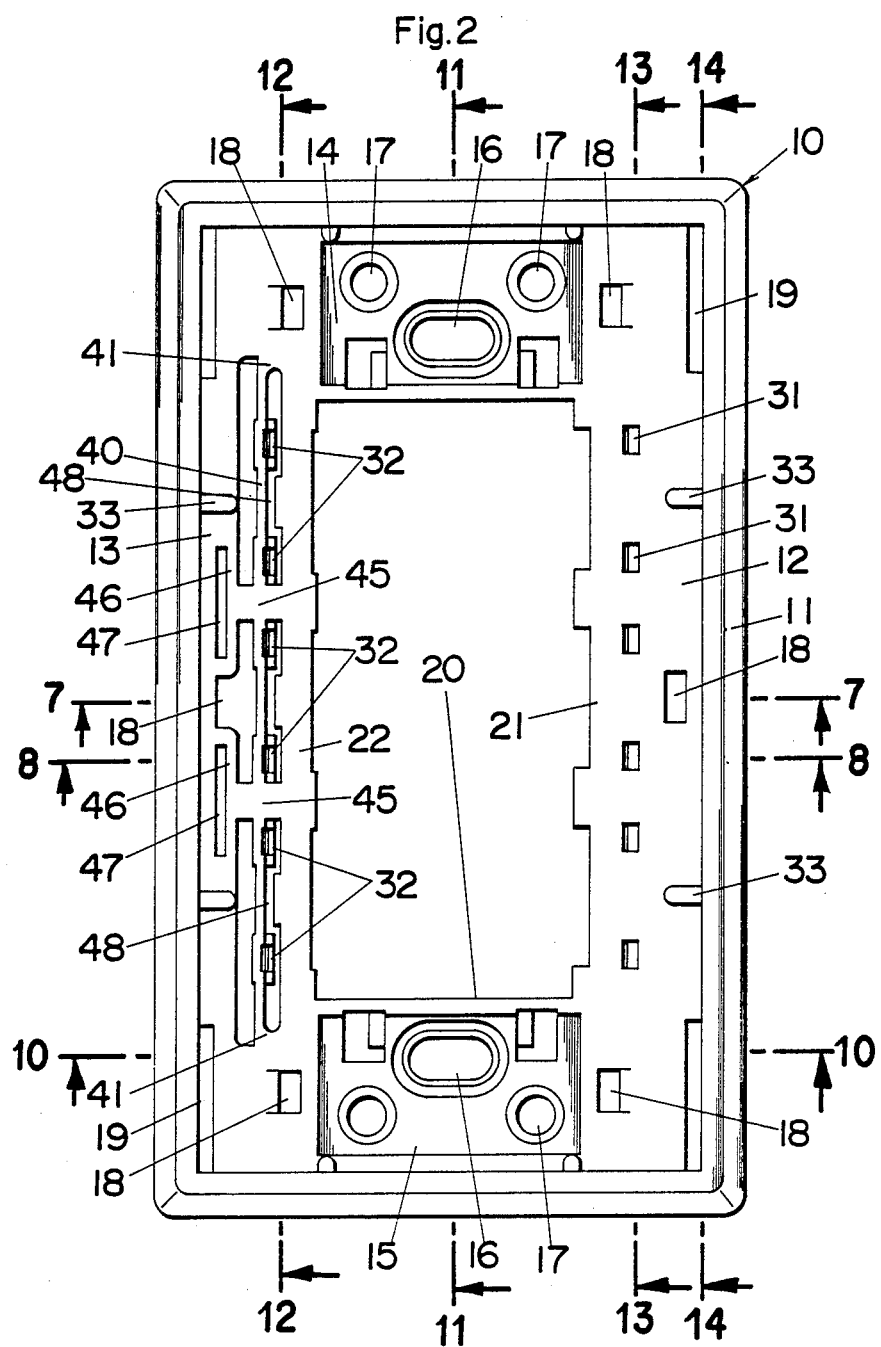
FIG. 2 is a front view of the bracket.

As shown in FIG. 2, the first nd second jamb 21 and 22 extend inwardly of the lateral peripheral flange 11 to leave therebetween side marginal areas 12 and 13. Likewise left between the end edges of the center opening 20 and the longitudinal peripheral flange 11 are respective end marginal areas 14 and 15 each formed with an elongated aperture 16 and a pair of holes 17 for connection with the box embedded in the wall or the wall surface by the use of a screw (not shown). The side and end marginal areas are concealed by the cover plate 50 which is attached to the frame 10 with its rearward projecting barbs 52 hooked into corresponding holes 18 formed in the corner portions and the middle portions along the lateral peripheral flange 11 of the frame 10.

Figure 3:
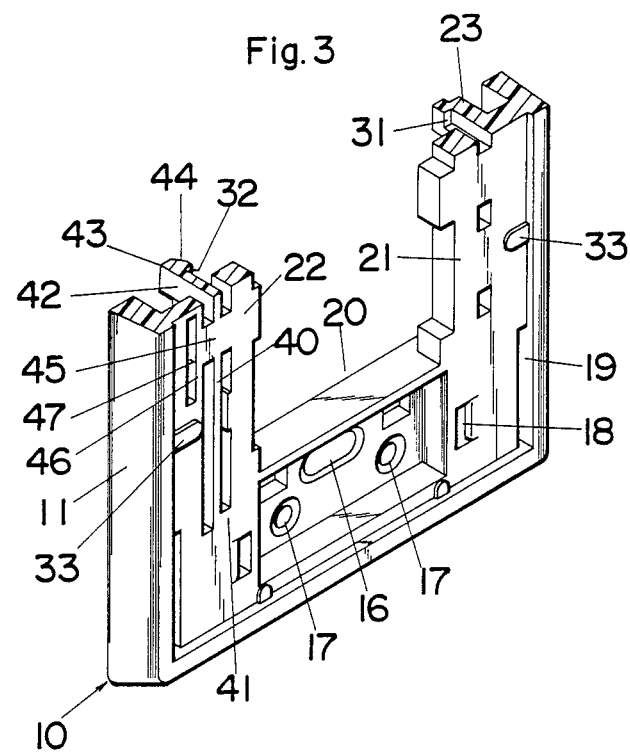
FIG. 3 is a partial perspective view of the bracket shown with its section corresponding to cut line 3—3 of FIG. 1.
Figure 4:
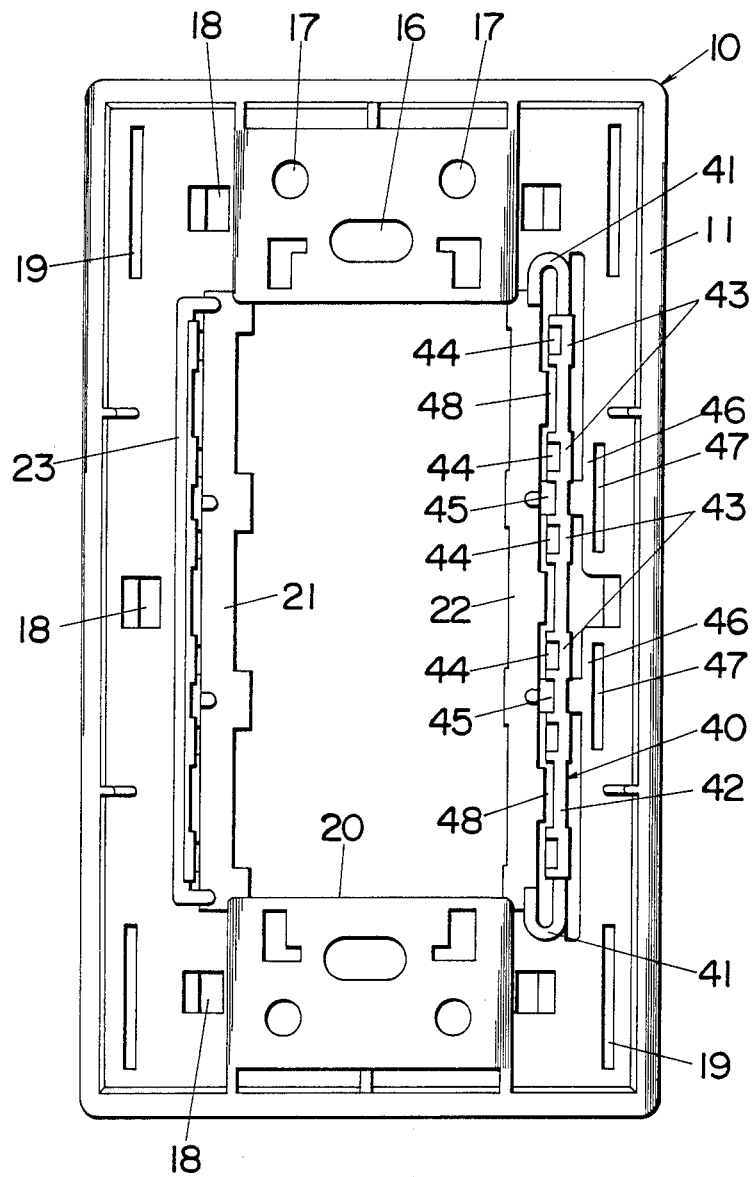
FIG. 4 is a rear view of the bracket.
Figure 5:
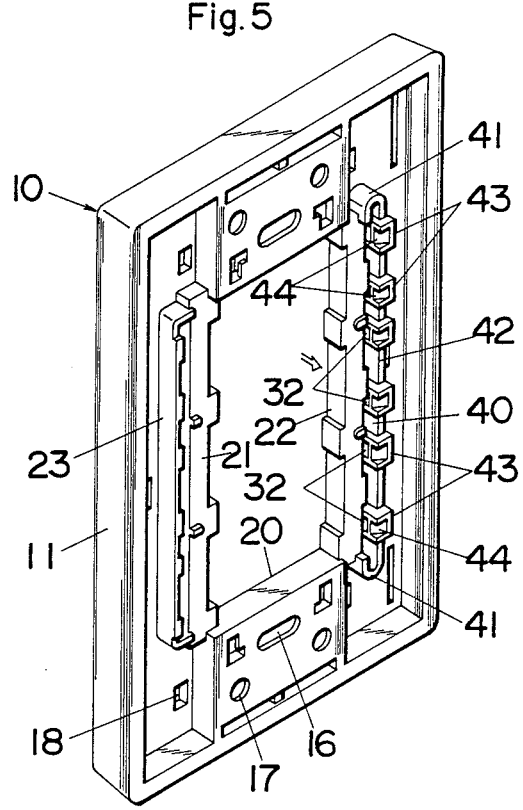
FIG. 5 is a perspective view of the bracket as viewed from the rear.
Figure 6:
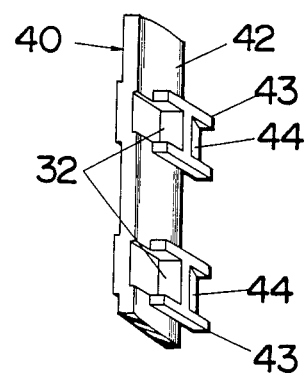
FIG. 6 is a partial perspective view of a portion as viewed from the direction indicated by an arrow in FIG.,5.
Figure 7:
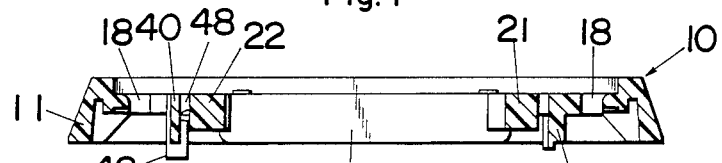
FIG. 7 is a cross section taken along line 7—7 of FIG. 2.
Figure 8:
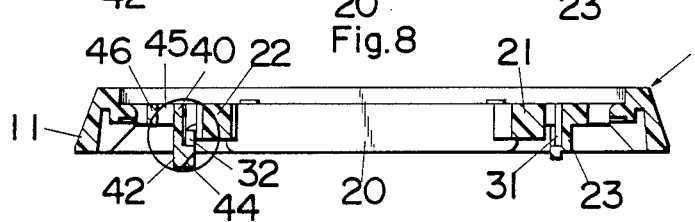
FIG. 8 is a cross section taken along line 8—8 of FIG. 2.
Figure 9:
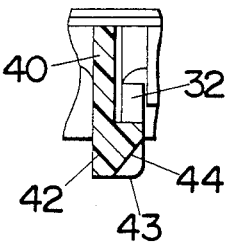
FIG. 9 is an enlarged view of a circled portion in FIG. 8.
Figure 10:
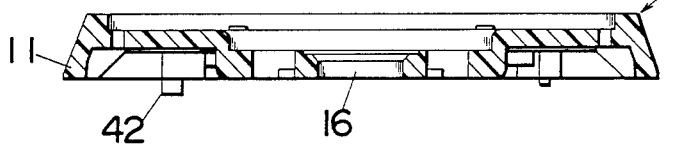
FIG. 10 is a cross section taken along line 10—10 of FIG. 2.

The first jamb 21 is made rigid resisting substantial deformation and integrally includes on its rear a rigid strip 23 extending in parallel relation therewith, as shown in FIGS. 3, 4, 5, and 8. It is in this rigid strip 23 that the first slots 31 are made for receiving the mounting ears 3 on one side of the wiring device 1. The first slots 31, which are provided in three pairs corresponding to three wiring devices, are open laterally to the center opening 20 within the plane just below the rear face of the first jamb 21. Each first slot 21 is also open to the front surface of the first jamb 21 as a result of molding requirements, which are seen in FIGS. 1 to 3. The second jamb 22 is of a width resisting substantially large deformation but allowed to flex at its middle section only in a limited amount. Extending in parallel relation to and outwardly of the second jamb 22 is a resilient strip 40 which has a width less than the second jamb 22 to be capable of flexing resiliently. The resilient strip 40 is connected integrally at its longitudinal ends to the adjacent ends of the second jamb 22 respectively through U-shaped hinge sections 41 which are bent within the plane of the frame 10 so that the resilient strip 40 can flex outwardly within the same plane. Three pairs of the second slots 32, each pair for one wiring device, are formed along the length of the resilient strip 40 and are open to the center opening 20 past the rear surface of the second jamb 22, as shown in FIGS. 2, 5, 8, 11 and 12, for receiving the corresponding mounting ears 3 on the selected wiring device or devices 1. A skirt 42 integrally project rearwardly from the length of the resilient strip 40 except for the U-shaped hinge sections 41 and is formed with a series of taper guides 43 on its inner surface opposite to the center opening 20 at portions immediately behind the corresponding second slots 32. As shown in FIG. 5, each of the taper guides 43 has a guide surface 44 inclined rearwardly and outwardly from the rear edge of each second slot 32 and terminating at the rearward edge of the skirt 42 so as to guide the mounting ear 3 into the corresponding second slot 32. The length of the resilient strip 40 is divided into three sections each having the pair of the second slots 32 by two longitudinally spaced cross ribs 45 each connected integrally at its one end to the second jamb 22. The other end of each cross rib 45 is integrally connected to an additional resilient segment 46 extending in parallel relation to and outwardly of the resilient strip 40. The additional resilient segment 46 is spaced from the peripheral flange 11 by an elongated crevice 47 and extends a short distance along the lateral peripheral flange 11. With the provision of the cross ribs 45 dividing the length of the resilient strip 40 into the three sections, the two end sections and the middle section can have substantially the same amount of lateral flexing so that the wiring device can be attached selectively to either of the three sections in substantially the same manner. In detail, each of the end sections undergoes its outward flexing as involving the flexing of the adjacent one of the additional resilient segments 46, while the middle section undergoes its outward flexing as involving the flexing of both the additional segments 46. In the flexing of each section, the middle portion of the second jamb 22 linked to the cross ribs 45 undergoes outward flexing in a slight amount to ensure the equal flexing capability to the end and middle sections of the resilient strip 40. In other words, the middle portion of the second jamb 22 which is more likely to flex than the end portions is cooperative with the flexing of the additional resilient segments 46 connected by the respective cross ribs 45 to permit the resilient strip 40 to effect substantially the independent flexing at each of the three sections.

Figure 15:
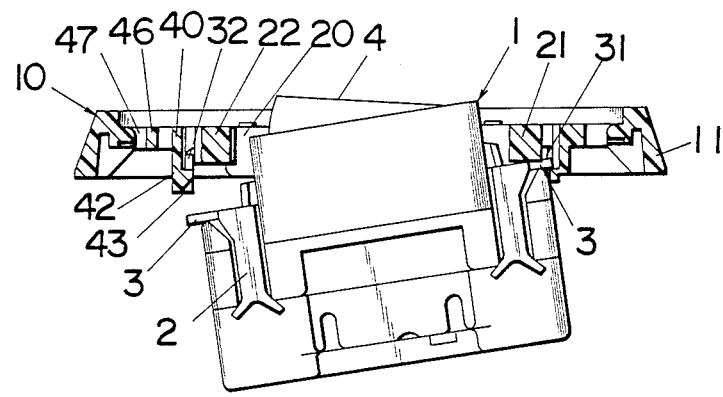
FIG. 15 is an explanatory view illustrating the snapping connection of the wiring device to the bracket.

The wiring device 1 is attached to the frame 10 by snap engagement of the mounting ears 3 to the corresponding first and second slots 31 and 32. As shown in FIG. 15, the wiring device 1 is placed into the frame 10 from the rear with its front portion projecting into the center opening 20 and with the mounting ears 3 on one side of the device 1 into the first slots 31. As the device 1 is further pressed forward, or upwardly in the figure until the strap 2 of the device 1 abuts against the first and second jambs 21 and 22, the mounting ears 3 are urged against the guide surfaces 44 of the corresponding taper guides 43 to resiliently flex the resilient strip 40 at the corresponding section to such an extent as to allow the mounting ears 3 to ride up the inclined guide surfaces 44 into engagement with the corresponding second slots 32, after which the resilient strip 40 returns inwardly by its inherent resiliency to an original position to make the mounting ears 3 into locked engagement with the second slots 32. In this manner, the wiring device 1 can be attached to the bracket by snap-in connection of the mounting ears 3 without requiring any additional tool such as a screwdriver or the like.

When the device 1 needs to be detached from the bracket for a replacement purpose, for example, the resilient strip 40 is forced to flex outwardly to allow the disengagement of the mounting ears 3 from the second slots 32. This outward flexing can be easily effected by inserting the tip of a screwdriver or the like tool into a gap 48 formed between the resilient strip 40 and the second jamb 22. After the mounting ears 3 are disengaged from the second slots 32, the mounting ears 3 on the opposite side o the device 1 can be readily removed from the first slots 31 to completely detach the device 1.

The first and second jambs 21 and 22, the resilient strip 40, the additional resilient segments 46, and the cross ribs 45 have their front surfaces arranged substantially to be flush to each other. In the marginal areas around the center opening 20, there are formed a number of tiny platforms 33 which project upwardly slightly on the remaining front surface for abutment with the undersurface of the cover plate 50 which is received within the confines of the peripheral flange 11 with its front face flush to that of the peripheral flange 11.

Figure 16:
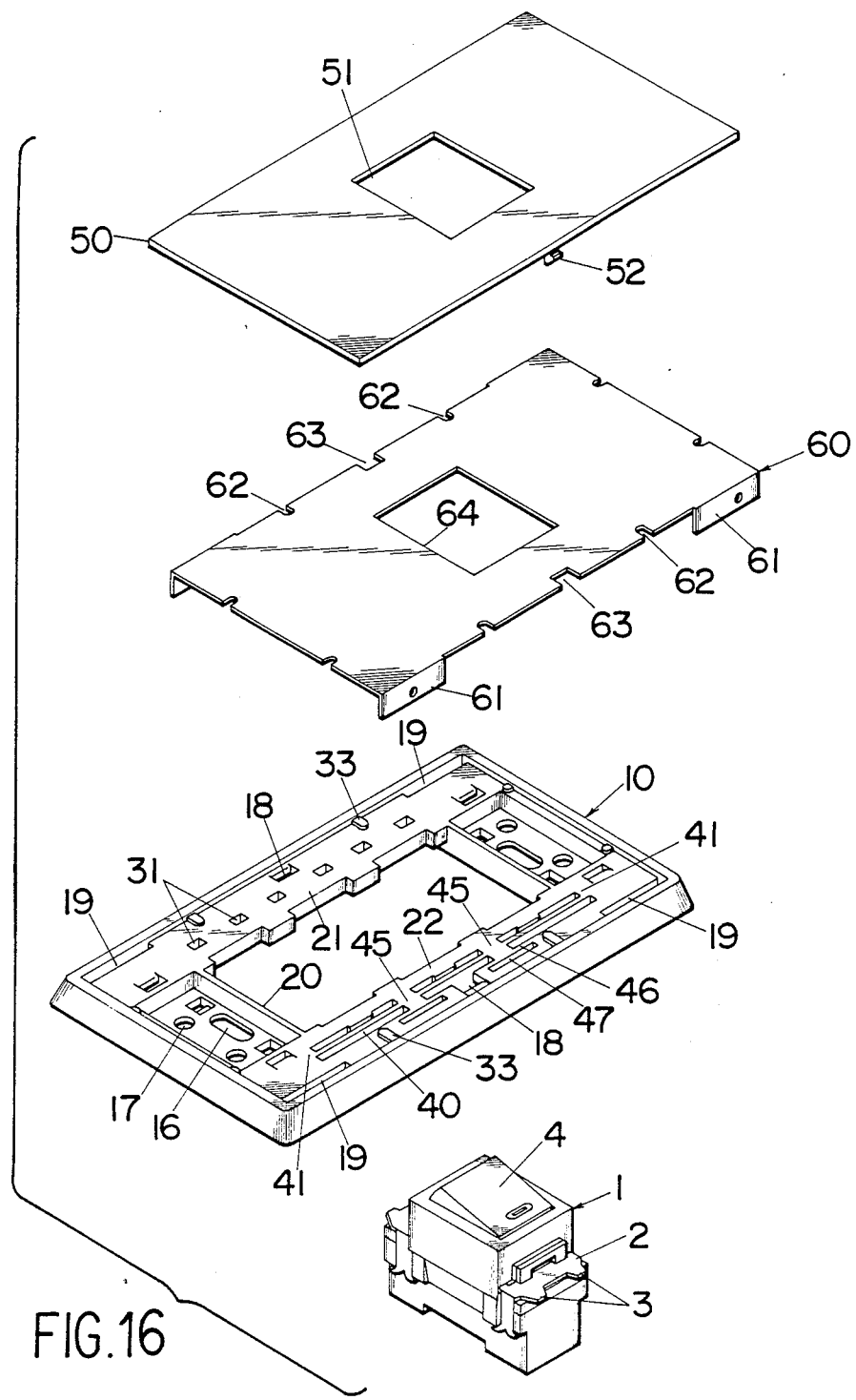
FIG. 16 is an exploded perspective view of the bracket shown with a flame resistant metallic panel to be interposed between the bracket and the cover.

FIG. 16 shows another usage of the bracket in which a flame-resistant panel 60 is interposed between the frame 10 and the cover plate 50. The panel 6 is attached to the frame 10 with its bent tabs 61 fitted in slits 19 in the corners of the frame 10 and also with its notched recesses 62 engaged with the platforms 33 in the marginal area around the center opening 20. Also formed in the peripheral edge of the panel 60 are indentations 63 which allow the hooking connections between the barbs 52 of the cover plate 50 and the holes 18 in the frame 10. The panel 60 is selected to have an opening 64 of the size corresponding to that of the window 51 in the cooperative cover plate 50.

Figure 17:
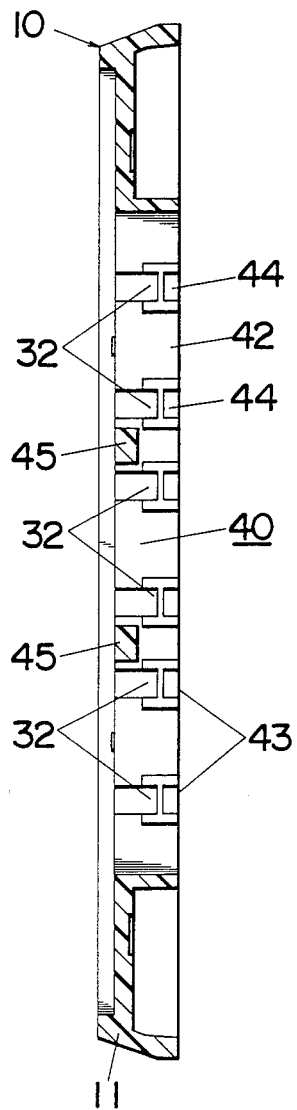
FIG. 17 is a sectional view of a bracket in accordance with a second embodiment shown in cross section corresponding to line 12—12 of FIG. 2.
Figure 18:
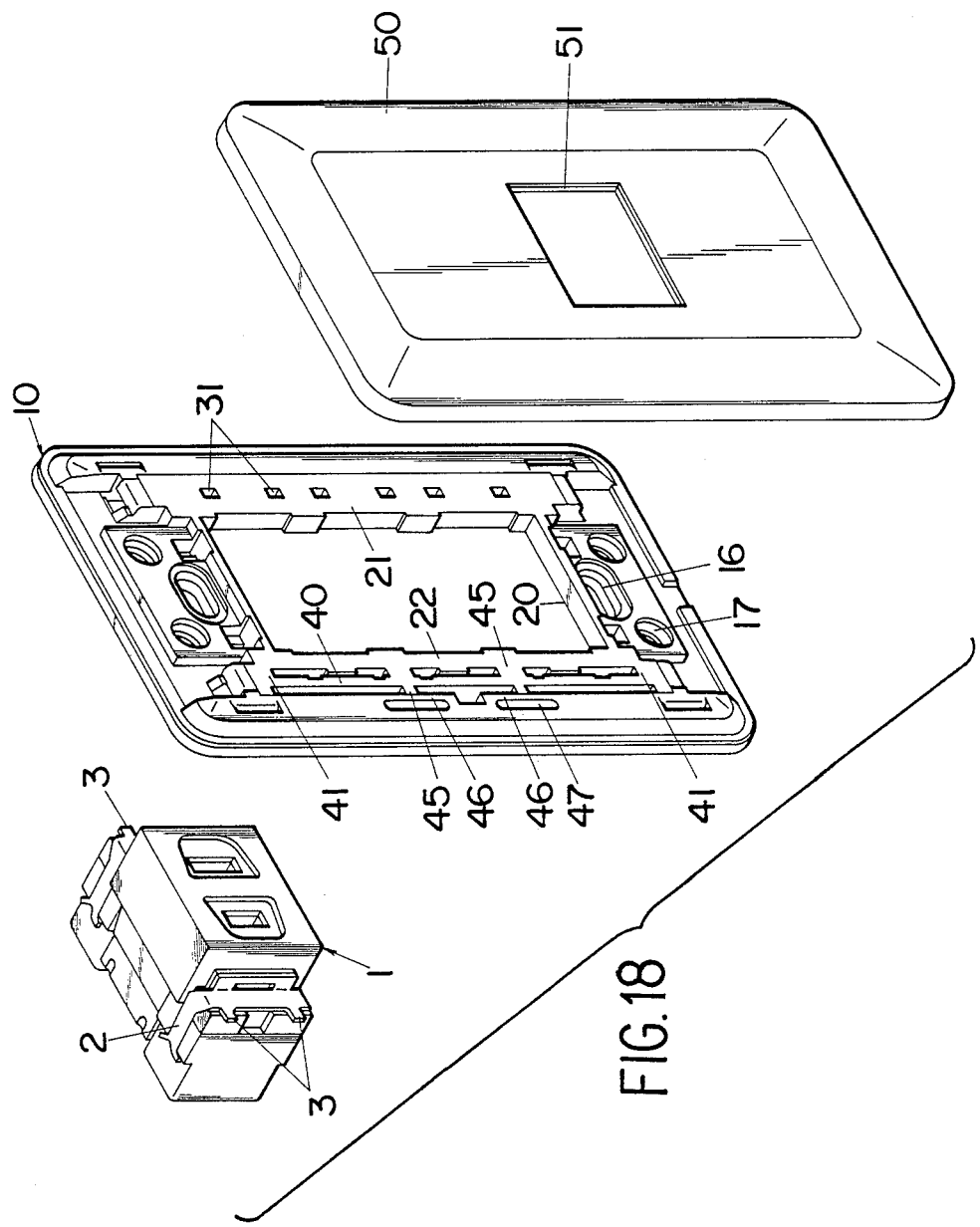
FIG. 18 an exploded perspective view of a third embodiment.
Figure 19:
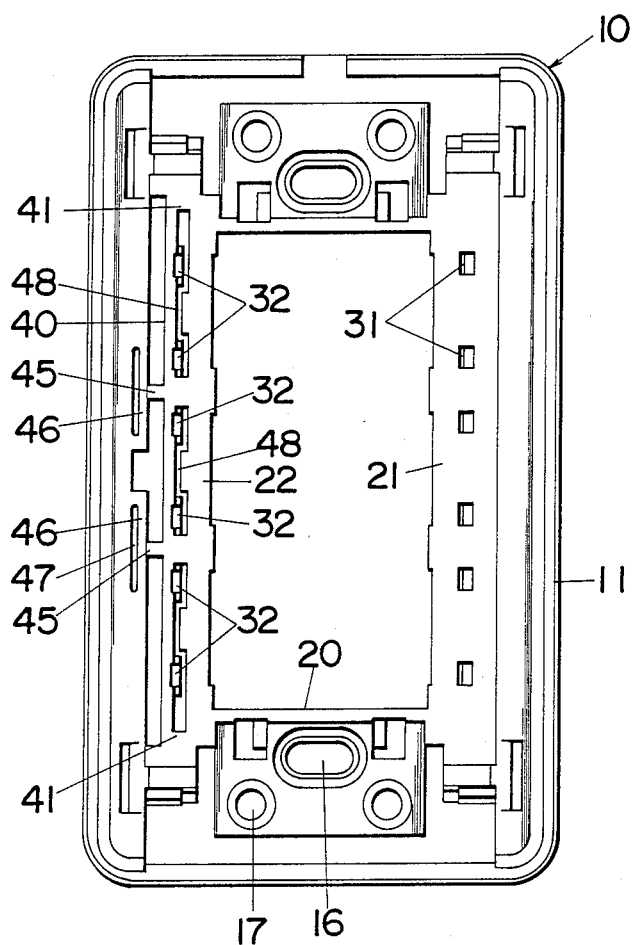
FIG. 19 is a front view of the bracket of FIG. 18.
Figure 20:
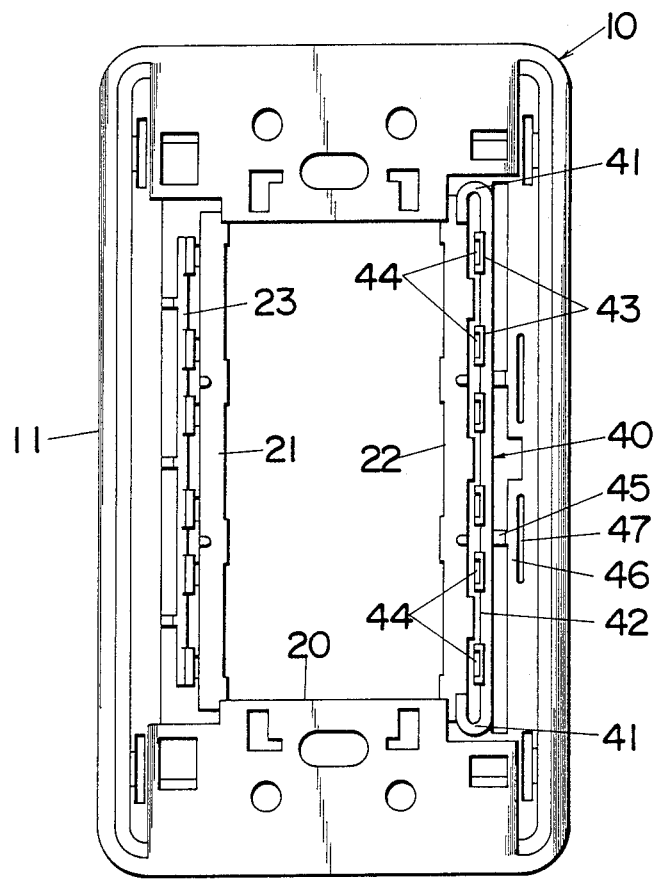
FIG. 20 is a rear view of the bracket of FIG. 18.

A bracket in accordance with a second preferred embodiment of the present invention is shown in FIG. 17 which corresponds to FIG. 12 for direct comparison purpose with that of the first embodiment. The bracket of the second embodiment is characterized in that the skirt 42 extending rearwardly from the resilient strip 40 is within the overall thickness of the frame 10. That is, the rearward edge of the skirt 42 is flush with the rear edge of the peripheral flange 11, so that the skirt 42 can be held against a wall surface together with the peripheral flange 11 when the bracket is installed. This means that the wall surface requires only a hole in the wall surface of a size accommodating only the rear projection of the wiring device 1 and requires no extra dimension for accommodating the skirt 42, which enhances the convenience of installing the wiring devices on the wall surface and is particularly advantageous in installation sites where an additional drilling operation is limited. The other structural features are identical to those of the first embodiment and therefore like numerals are employed to designate like parts for easy reference.

FIGS. 18 to 21 shows a modification of the above embodiment which is identical to the above first embodiment except for a minor aspect that the corners of the frame 10 are somewhat rounded. Consequently, like numerals are employed throughout the figures to designate like parts.

What is claimed is:

1. A bracket for mounting devices comprising:
   a flat frame having first and second parallel jambs which define therebetween a rectangular opening capable of receiving a plurality of wiring devices in side-by-side relation;
   each of said wiring devices having a body portion to be fitted through said opening and having a strap provided on each side thereof with at least one mounting ear by which each wring device is attachable to said frame;
   said first jamb having a series of longitudinally spaced first slots open to said opening for receiving said mounting ear on one side of each wiring device;
   a resilient strip integrally formed in said frame to extend along said second jamb in a spaced relation thereto outwardly thereof and having a series of second slots open to said opening for receiving said mounting ear on the other side of each wiring device; and
   said resilient strip integrally connected at its longitudinal ends to the longitudinal ends of said second jamb respectively through U-shaped hinge sections which are bent within the plane of said frame so that said resilient strip is capable of flexing outwardly within that plane to allow the engagement and disengagement of the mounting ear of each wiring device into and out of the corresponding second slot.

2. A bracket as set forth in claim 1, wherein said resilient strip includes integrally a rearwardly projectihg skirt which is formed with taper guides on its inner surface opposite to said opening, each of said taper guides having a guide surface inclined rearwardly and outwardly from the rear edge of each of said second slots and terminating at the rearward edge of said skirt, whereby the mounting ear can slide over said taper guide while flexing the said skirt together with said resilient strip outwardly to permit the mounting ear to come into locked engagement with said second slot.

3. A bracket for mounting wiring devices comprising:
   a flat frame in the form of a wall plate having a peripheral flange for direct mounting on a wall surface, said frame having a rectangularly-shaped opening capable of receiving up to three wiring devices in side-by-side relation;
   a pair of first and second jambs which define therebetween said opening and which are spaced inwardly of said peripheral flange to leave between each of said jambs and said peripheral flange marginal areas for receiving thereon a cover plate;
   each of said wiring devices having a body portion to be fitted through said opening and having a strap provided on either side thereof with at least one mounting ear by which each wiring device is attachable to said frame;
   said cover plate formed with a window through which the front end of each wiring device will project;
   a rigid strip integrally projecting on the rear face of said frame to extend along said first jamb outwardly thereof, said rigid strip having a series of longitudinally spaced first slots open to said opening for receiving said mounting ear on one side of each wiring device;
   a resilient strip integrally formed in said frame to extend along said second jamb in a spaced relation thereto outwardly thereof but inwardly of said peripheral flange and having a series of second slots open to said opening for receiving said mounting ear on the other side of each wiring device;
   said resilient strip integrally connected at its longitudinal ends to the longitudinal ends of said second jamb respectively through U-shaped hinge sections which are bent within the plane of said frame so that said resilient strip is capable of flexing within that plane outwardly to allow the engagement and disengagement of the mounting ear of each wiring device into and out of the corresponding second slot; and
   said resilient strip formed intermediate its longitudinal ends with two spaced cross ribs which divide the length of said resilient strip into three sections each corresponding one of the three wiring devices and each formed with at least one of said second slots;
   said marginal area outwardly of said second jamb being formed with two additional resilient segments each of which extends in parallel relation to said resilient strip as well as to the adjacent peripheral flange of said frame and is integrally supported at its longitudinal ends to said marginal area so that it is capable of resiliently flexing laterally within the plane of said frame,
   each of said cross ribs extending transversely of said resilient strip to have its ends integrally connected respectively to the second jamb and to each of said additional resilient segments such that each of said three sections of said resilient strip can flex substantially independently and in substantially equal amount for permitting the attaching and detaching of said wiring device to and from each of said three sections of said resilient strip in which each of the two end sections undergoes the flexing as involving the flexing of the adjacent one of the additional resilient segments while the middle section undergoes the flexing as involving the simultaneous flexing of both of said additional resilient segments.

4. A bracket as set forth in claim 3, wherein each of said additional resilient segments is defined as a segment spaced from the adjacent peripheral flange through an elongated crevice formed in said marginal area.

5. A bracket as set forth in claim 3, wherein said resilient strip includes integrally a rearwardly projecting skirt which is formed with taper guides on its inner surface opposite to said center opening, each of said taper guides having a guide surface inclined rearwardly and outwardly from the rear edge of each of said second slots and terminating at the rearward edge of said skirt, whereby the mounting ear can slide over said taper guide while flexing the said skirt together with said resilient strip outwardly to permit the mounting ear to come into locked engagement with said second slot.

6. A bracket as set forth in claim 5, wherein said rigid strip and said skirt are formed to be within the thickness of said peripheral flange of which rear face is adapted to abut on a wall surface.

7. A bracket as set forth in claim 5, wherein said first and second jambs, said resilient strip, and said additional resilient segments have their front surfaces arranged in substantially the same plane.

8. A bracket as set forth in claim 5, wherein said frame is molded from a synthetic plastic material as a one-piece construction to include said peripheral flange, said first and second jambs, said resilient strip, and said additional resilient segments and to have the front surfaces of these members arranged substantially in the same plane.

9. A bracket as set forth in claim 3, wherein each of said three sections of said resilient strip is formed with said second slots in a pair for receiving respectively two of said mounting ears projecting on each side of said wiring devices, and wherein said resilient strip includes integrally a rearwardly projecting skirt which is formed with taper guides on its inner surface opposite to said center opening, each of said taper guides having a guide surface inclined rearwardly and outwardly from the rear edge of each of said second slot and terminating at the rearward edge of said skirt, whereby the mounting ear can slide over said taper guide while flexing the said skirt together with said resilient strip outwardly to permit the mounting ear to come into locked engagement with said second slot.

* * * * *